March 20, 1956  M. C. MILLER  2,738,611
FISHING LURES
Filed May 3, 1954  2 Sheets-Sheet 1
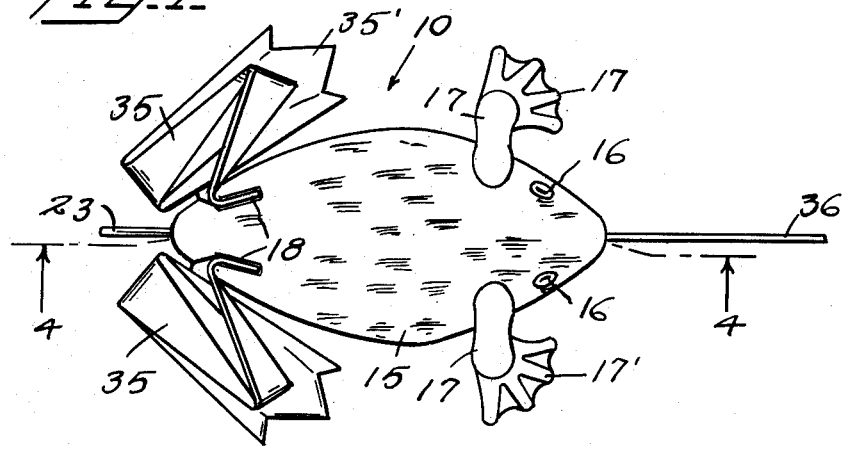
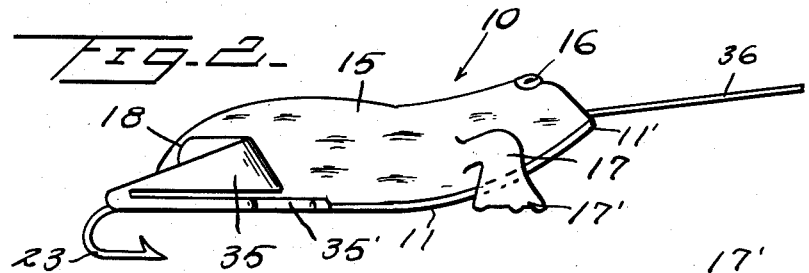
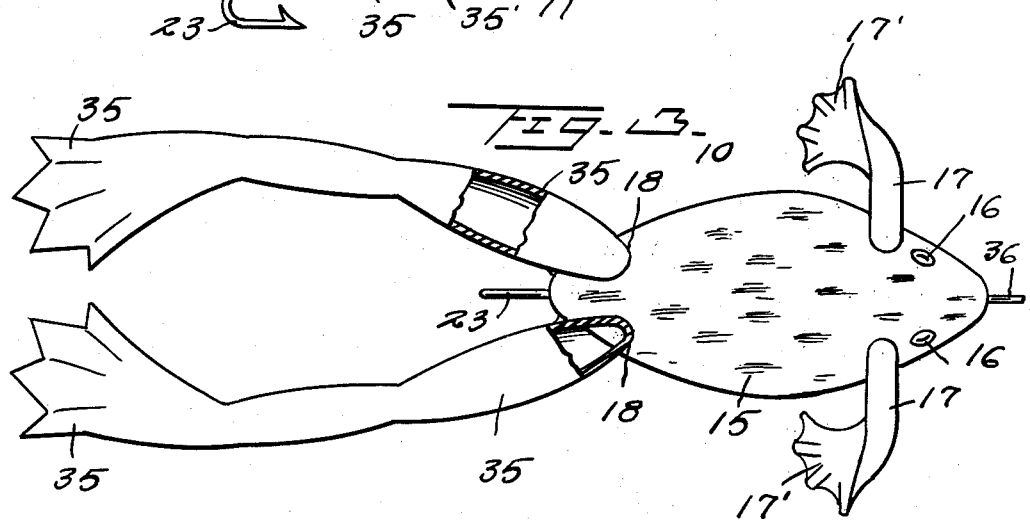
INVENTOR
M. C. Miller
BY Kimmel & Crowell
ATTORNEYS

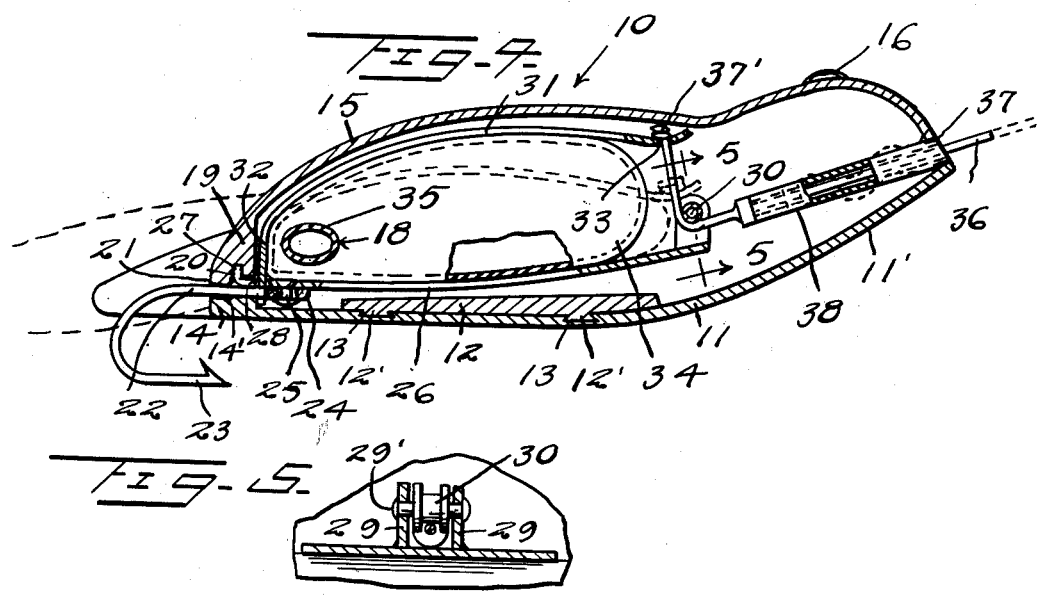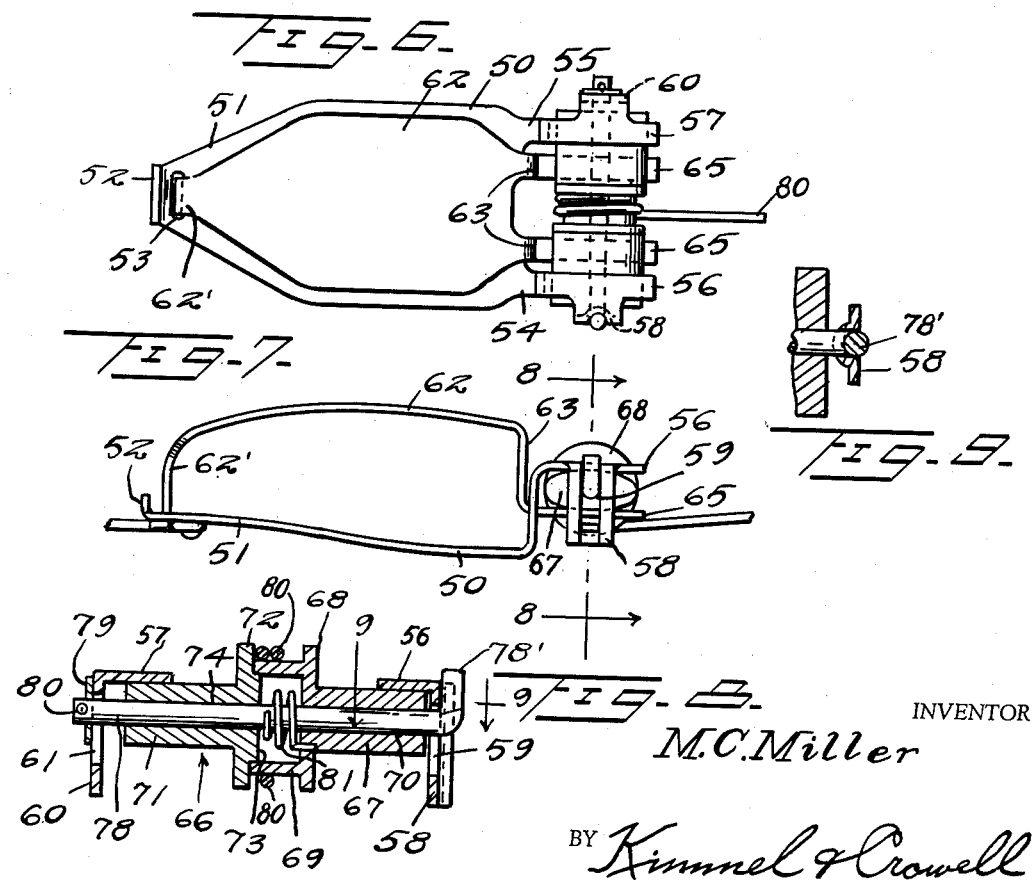

United States Patent Office

2,738,611
Patented Mar. 20, 1956

2,738,611

FISHING LURES

Milo C. Miller, Abilene, Tex.

Application May 3, 1954, Serial No. 426,982

5 Claims. (Cl. 43—42.02)

This invention relates to fishing lures, and more specifically to a device constructed to simulate live bait in size, appearance, and action.

One of the primary objects of this invention is to provide a fishing lure having the appearance of a tailless amphibian (frog) with means for actuating the rear appendages thereof in order to lend a sense of reality and simulated animation to the bait.

Another object of this invention is to provide a device of the type described with manually operated bellows means for actuating the legs of the frog type lure.

Other and further objects and advantages of the present invention will become more apparent from a consideration of the following specification when read in conjunction with the annexed drawings, in which:

Figure 1 is a top plan view of a fishing lure constructed in accordance with the teaching of this invention, and showing the appendages of the lure in their respective collapsed position.

Figure 2 is a side elevation of the lure shown in Figure 1.

Figure 3 is a top plan view of the lure illustrated in Figure 1 showing the appendages in extended position.

Figure 4 is a medial longitudinal cross-sectional view taken on the vertical plane of line 4—4 of Figure 1, looking in the direction of the arrows.

Figure 5 is an enlarged detail cross-sectional view taken on the line 5—5 of Figure 4, looking in the direction of the arrows.

Figure 6 is a top plan view illustrating a modified form of the bellows actuating means.

Figure 7 is a side elevation of the means shown in Figure 6.

Figure 8 is an enlarged detail cross-sectional view taken on the vertical plane of line 8—8 of Figure 7, looking in the direction of the arrows, and illustrating the cam actuating means, and Figure 9 is an enlarged detail cross-sectional view taken on the horizontal plane of line 9—9 of Figure 8, and looking in the direction of the arrows.

Referring now more specifically to the drawings, reference numeral 10 designates, in general, a fishing lure constructed in accordance with this invention. The lure 10 comprises an elongated base plate 11 having a substantially ovate configuration with an end portion 11' upwardly bent in the direction of its major axis. A weight 12 formed of lead or other easily malleable material is provided with a plurality of laterally extending lugs 12' which are adapted to be press fitted within the dove tail slots 13 which extend downwardly from the upper side of the plate 11. The other end of the plate 11 is formed with a vertical wall 14 which extends transversely thereof and is provided with a centrally positioned semi-circular longitudinal groove 14' at the upper edge thereof.

A substantially hollow inverted concave casing 15 having the general configuration of a frog's back, sides and head, has the lower edges thereof secured to the plate 11 adjacent the marginal peripheral edges thereof. The head end of the simulated frog lure 10 is also provided with a pair of protuberances 16 which simulate the eyes of a frog.

A pair of tubular members 17 comprise the front legs of the bait and extend laterally from each side of the casing 15 adjacent the head or front end thereof and terminate in flattened extensions 17' convoluted to simulate webbed feet.

The lure, adjacent the rear end and on opposite sides of the casing 15 is formed with a pair of openings 18 which serve a purpose to be described. The casing 15 is constructed with an enlarged boss 19 at the rear end which has formed therein a transverse slot 20 extending inwardly from the lower end thereof and a centrally positioned semi-circular longitudinal groove 21 which is positioned to cooperate with the slot 14' to define a circular opening to receive the shank 22 of a fish hook 23 therethrough when the plate 11 and casing 15 are assembled as described.

The inner end of the shank 22 terminates in an eye portion 24 which is riveted at 25 to an elongated substantially rectangular metal plate 26 adjacent the rear end thereof. The plate 26 is arcuately shaped in longitudinal cross-section and terminates at its rear end in an upstanding flange 27 which is received within the slot 20. Intermediate the rivet 25 and the flange 27 a transversely extending slot 28 is formed in the plate 26.

Adjacent the front end of the plate 26 a pair of integrally formed spaced standards 29 are provided intermediate the sides thereof which are adapted to support therebetween a cross-pin 29' carrying a pulley 30 thereon.

A second elongated substantially rectangular plate 31, also arcuately shaped in longitudinal cross-section, is provided and has an integrally formed downward extending side 32 of reduced width at the rear end thereof adapted to loosely pass through the slot 28 of the plate 26. A centrally positioned aperture 33 is extended through the plate 31 adjacent its front end.

A hollow air filled bulbous element 34 formed of resilient and flexible material is interposed between the plates 26 and 31 and has one end of a pair of elongated flexible resilient tubular members 35, formed of rubber or other similar materials, secured to opposite sides thereof and in open communication with its interior.

The members 35 are passed through the openings 18 and are pre-formed so as to normally collapse in a substantially flat Z-shaped configuration to simulate a frog's hind legs and feet 35'.

A fish line leader 36 is passed through a recess 37 formed in the casing 15 at its front end and is extended below and around the pulley 30 and is threaded through the aperture 33 and knotted at 37' to prevent withdrawal thereof. A flexible tubular water seal 38 surrounds a portion of the leader within the lure 10 and has an end thereof sealed to the casing 15 around the recess 37.

The casing 15 and base member 11 may be formed of plastic or other suitable materials and may be secured together in any conventional manner and the value of the weight will depend upon whether the lure 10 is to lie on the surface of a body of water or the bed thereof.

In operation, and assuming the lure and its component elements are as shown in Figures 1, 2 and 4, the operator exerts a force on the leader 36 which forces the plate 31 to pivot towards the plate 26 with the bulbous member 34 therebetween. The air therein is compressed and passes into the collapsed tubular members 35 causing them to inflate and distend rearwardly of the lure, see Figure 3, in simulation of a leaping or swimming frog. Upon relaxation of the force on the leader, the member 34 expands and withdraws the air from the tubular members 35 which then reassume their original collapsed Z-configuration adjacent the opposite sides of the lure 10.

Figures 6 to 9, inclusive, illustrate a modification of the means for operating the bulbous member. As shown therein, an elongated bottom plate 50 having a substantially rectangular configuration is provided and is reduced in its transverse dimension to form a tab 51 at one end thereof, the tab 51 terminating in an upright wall 52. A slot 53 extends transversely of the tab 51 adjacent the flange 52. A pair of integrally formed extension members 54, 55 project upwardly from the plate 50 at the front end thereof and are bent intermediate their respective ends to form end projections 56, 57 disposed substantially parallel to the plate 50 and projecting longitudinally away therefrom.

An elongated integrally formed bracket 58 depends from the end projection 56 and is provided with a vertical slot 59 intermediate the sides thereof. A second integrally formed bracket 60 depends from the end projection 57 and is provided with a vertical slot 61 aligned with the slot 59.

A second plate member 62 having a substantially rectangular configuration is bent laterally and reduced in its transverse dimension to form a side 62' the end of which extends loosely through the slot 53.

At the other end of the plate 62 a pair of integrally formed spaced arms 63 depend and are bent intermediate their respective ends to form longitudinally extending projecting ends 65. As seen in the drawings the arms 63 and projecting ends 65 are positioned intermediate the extension members 54, 55 and below their respective end projections 56, 57.

Referring to Figure 8, an elongated two part cam is designated, in general, by the reference numeral 66 of which one of the cam parts 67 is provided with a flange 68 having a circular hollow casing 69 projecting laterally from a side thereof, and a longitudinally extending central bore 70. The other cam part 71 is constructed with a circular radially extending flange 72 at an end thereof and has a circular groove formed therein to form a longitudinally extending circular boss 73 adapted to be pressed within the open end of the casing 69. The cam part 71 is also provided with a longitudinal bore 74 which is coaxially aligned with the bore 70.

The cam 66 is positioned intermediate the end projections 56, 57 and 65 and is supported for rotation between the depending flanges 58 and 60 by a shaft 78 which extends through the bores 70, 74, the casing 68 and the slots 59 and 61. The shaft 78 has an end portion 78' thereof bent normal to its longitudinal axis which engages the flange 58 on opposite sides of the slot 59 to lock the shaft against rotation. Axial displacement of the shaft is prevented by a washer 79 and cotter pin 80 at the other end thereof.

A helicoidal spring 81 is mounted on the shaft 78 in the casing 69 and has one end thereof affixed thereto while its other end is anchored to the cam part 67 to bias the cam 66 for rotation in one direction on the shaft 78.

As is seen in Figure 8, the flanges 68, 72 and the casing 69 cooperate to form a reel to receive a plurality of turns of a leader 80.

In assembly, the modified structure is positioned within lure 10 with the flange 52 engaging within the slot 20 with the leader extending through the recess 37 with the plates 50 and 62 engaging opposite sides of the bulbous member 34.

It will be understood that in operation a continuous force exerted on the leader 80 will cause the cam 66 to rotate against the tension of the spring 81 between the end projections 56, 57 and 65 to compress the bulbous member 34 when the high sides of the cam is engaged therebetween, and to permit the bulbous member to expand when the lower sides of the cam are embraced by the projections.

The compression of the bulbous member 34 causes the tubular members 35 to inflate and distend as described before, and upon its expansion air is forced through the tubular members 35 and returns to the bulbous member 34, the tubular members 35 returning to their original position.

Having described and illustrated two embodiments of this invention, it will be understood that the same are offered by way of example, and that the invention is only to be limited by the scope of the following claims.

What is claimed is:

1. A fishing lure comprising an elongated substantially hollow closed body having a resilient bulbous air containing member disposed therein, said bulbous member having a plurality of normally collapsed tubular extensions connected therewith and extending through said body, and means embracing said bulbous member and operably connected with a fish line for actuating said means to compress said bulbous member and inflate said tubular extensions.

2. A fishing lure comprising an elongated hollow closed body having a pair of spaced plates disposed therein, said plates having a pair of adjacent ends thereof connected together, a resilient air container positioned between said plates and having a plurality of normally collapsed tubular members connected thereto and extending through said body, and means on one of said plates for connection with one end of a leader, whereby a force exerted on said leader will cause said one plate to move toward the other of said plates to compress said container and inflate said tubular members.

3. A fishing lure comprising an inverted concave casing having an open bottom and an external configuration simulating the back, sides and head of a frog, a closure member for said open bottom, an elongated plate having one of its ends secured to said casing adjacent the rear end thereof, a spring metal plate having an end secured to said one end of said first plate and supported thereover for movement toward and away from said first plate, an air containing resilient and flexible bulbous member positioned intermediate said first and second plates and having a pair of elongated, normally collapsed, tubular members simulating frog legs connected thereto and extending through said casing on opposite sides of the rear end thereof, said casing having an opening at the front end thereof to receiver one end of a leader therethrough, and means on said second plate for connecting said leader thereto for actuating said second plate for movement towards said first plate, whereby said air containing member is compressed and forces the air therein into said collapsed tubular members to inflate the latter.

4. A fishing lure comprising an inverted concave casing having an open bottom and an external configuration simulating the back, sides and head of a frog, a closure member for said open bottom, an elongated plate having one of its ends secured to said casing adjacent the rear end thereof, a spring metal plate having an end secured to said one end of said first plate and supported thereover for movement towards and away from said first plate, an air containing resilient and flexible bulbous member positioned intermediate said first and second plates and having a pair of elongated, normally collapsed, Z-shaped tubular members simulating the hind legs of a frog connected thereto and extending through said casing on opposite sides of the rear end thereof, said casing having an opening at the front and thereof to receive one end of a leader therethrough, and a pulley mounted on said first plate adjacent the other end thereof, said second plate having an aperture formed therein in registry with said pulley, and said leader being passed below and around said pulley and threaded through said aperture and secured therein, whereby a force applied to said leader actuates said second plate for movement towards said first plate and compressing said air containing member therebetween to force the air therein into said collapsed tubular members to inflate and distend the latter rearwardly.

5. A fishing lure comprising an inverted concave casing having an open bottom and an external configuration simulating a frog, a closure member for said open bottom, an elongated plate having one of its ends secured to the rear end of said casing and having a pair of spaced elevated end projections, a second plate having an end connected to said one end of said first plate and elevated thereover, a pair of downwardly offset end projections positioned below and between said first end projections, a bulbous air container disposed intermediate said first and second plates and having a pair of elongated normally collapsed Z-shaped tubular members connected thereto and extending through said casing on opposite sides thereof adjacent its rear end and simulating a pair of hind legs, an elongated cam interposed between said first and second end projections and having a reel portion intermediate the ends thereof, a shaft for said cam, means supporting said shaft on said first end projections, and means biasing said cam and said portion for rotation on said shaft in one direction, said casing having an opening therein adjacent the front end thereof to receive therethrough a leader for winding on said portion.

References Cited in the file of this patent

UNITED STATES PATENTS

| | | |
|---|---|---|
| 536,512 | Crossley et al. | Mar. 26, 1895 |
| 882,604 | Wood | Mar. 24, 1908 |
| 1,393,617 | Frame | Oct. 11, 1921 |
| 1,488,626 | Steiner et al. | Apr. 1, 1924 |
| 2,415,742 | Hiltabidel et al. | Feb. 11, 1947 |
| 2,534,482 | Terhorst | Dec. 19, 1950 |